(12) United States Patent
Fuchtner

(10) Patent No.: US 7,736,255 B2
(45) Date of Patent: Jun. 15, 2010

(54) DRIVE DEVICE FOR AT LEAST ONE MACHINE AUXILIARY UNIT

(75) Inventor: Martin Fuchtner, Stuttgart (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 12/431,867

(22) Filed: Apr. 29, 2009

(65) Prior Publication Data
US 2009/0280939 A1 Nov. 12, 2009

(30) Foreign Application Priority Data
May 10, 2008 (DE) ........................ 10 2008 023 177

(51) Int. Cl.
F02B 67/06 (2006.01)
(52) U.S. Cl. ....................... 474/170; 474/148
(58) Field of Classification Search ................... 474/70, 474/148, 170; 475/177
See application file for complete search history.

(56) References Cited
U.S. PATENT DOCUMENTS
4,395,865 A * 8/1983 Davis et al. .................. 56/13.3
4,960,081 A * 10/1990 Atsuumi ................... 123/41.31
6,832,970 B2 * 12/2004 Eibler ......................... 475/177
7,004,866 B2 * 2/2006 Kirstein ....................... 474/148
2006/0100051 A1 * 5/2006 Di Giacomo et al. ........ 474/170
2006/0122014 A1 * 6/2006 Kamdem ..................... 474/70
2007/0232435 A1 * 10/2007 Serkh .......................... 475/269

FOREIGN PATENT DOCUMENTS
DE 1 107 033 12/1964
DE 102 00 686 8/2002

* cited by examiner

Primary Examiner—Christopher P Schwartz
(74) Attorney, Agent, or Firm—Gerald E. Hespos; Michael J. Porco

(57) ABSTRACT

A drive device (1) for machine auxiliary units (K, L, S/G) for transmitting a machine drive force from a machine (VM) to the machine auxiliary units by a belt. At least one machine auxiliary unit is provided as an electrical machine (S/G) that has either a poly-V-belt pulley to be driven by a poly-V-belt or a toothed belt pulley to be driven by a toothed belt. The belt has a toothed side ($R_1$) and a poly-V side ($R_2$) opposite one another, wherein a machine belt pulley is designed to drive the toothed side of the belt for transmitting the machine drive force, if the electrical machine has a poly-V-belt pulley, or is designed as a poly-V-belt pulley if the electrical machine has a toothed belt pulley.

19 Claims, 1 Drawing Sheet

DRIVE DEVICE FOR AT LEAST ONE MACHINE AUXILIARY UNIT

CROSS REFERENCE TO RELATED APPLICATION

This application claims priority under 35 USC 119 to German Patent Application No. 10 2008 023177.0 filed on May 10, 2008, the entire disclosure of which is incorporated herein by reference.

BACKGROUND OF THE INVENTION

1. Field of the Invention

The invention relates to a drive device for machine auxiliary units.

2. Description of the Related Art

Machines, such as the internal combustion engine of a motor vehicle, usually have various associated machine auxiliary units, such as a generator for generating power, an air-conditioning unit, a power steering unit, a water pump etc. The internal combustion engine or other such machine typically employs a belt to drive the machine auxiliary units. More particularly, the crankshaft of the internal combustion engine has a belt pulley for driving the belt and the belt is coupled mechanically to belt pulleys of the machine auxiliary units. Therefore, the machine auxiliary units are rotated simultaneously and are driven by the belt as the internal combustion engine rotates.

The use of a belt to transmit a high torque from the machine to the machine auxiliary units can be difficult. A wider belt can be used to transmit a higher torque. However, a wider belt requires a corresponding amount of installation space to be available. The belt tension also can be increased to transmit the higher torque, but the higher tension subjects the bearings to higher loads. Interlocking belts, such as toothed belts, can be used, but are particularly disadvantageous if the coupled machine auxiliary unit is an electrical machine or a generator. More particularly, the high degree of inertia of the generator can subject the belt to a high level of loading due to rotary vibrations of the machine. This problem is particularly likely if the machine is an internal combustion engine that has a crankshaft to drive the belt.

DE 102 00 686 discloses using a poly-V-belt with corresponding belt pulleys for driving the machine auxiliary units by the crankshaft.

DE 1 107 033 discloses a combined V- and toothed belt. However, DE 1 107 033 explains only that the V-belt is suitable for transmitting considerable forces, whereas the toothed belt is provided to transmit precise control movements.

The object of the invention is to provide an alternative drive device for machine auxiliary units, of which at least one is an electrical machine.

SUMMARY OF THE INVENTION

The invention uses a belt to correct the mechanical coupling between an internal combustion engine and an electrical machine. More particularly, the belt has a special configuration for introducing the force into the belt separately from the transmission of the force to the electrical machine. The preferred belt has a tooth system on one side and a poly-V on the opposite side. The electrical machine may have a poly-V-belt pulley and the internal combustion engine may have a toothed crankshaft belt pulley to drive the toothed side of the belt for transmitting the drive force of the internal combustion engine. Alternatively, the electrical machine may have a toothed belt pulley and the internal combustion engine may have a poly-V-belt pulley to drive the poly-V side of the belt for transmitting the drive force of the internal combustion engine. The interlocking connection between the toothed side of the belt and the toothed belt pulley provides reliable transmission of a strong torque between the internal combustion engine or machine and the electrical machine. The use of the poly-V-side of the belt for transmitting the torque between the belt and the poly-V-belt pulley provides a high level of damping of possible rotary vibrations due to slipping. The belt can transmit a torque from the internal combustion engine or machine to the electrical machine (generator operation of the electrical machine) and also can transmit a torque from the electrical machine to the internal combustion engine or machine (motor operation of the electrical machine). This novel use of a combined V- and toothed belt enables a reliable transmission of a high torque between the crankshaft and the electrical machine without a high level of vibrational loading that would lead to a weakening of the belt or to the production of noise by the belt. As an alternative, the belt side of the belt opposite the toothed side can have a configuration other than the poly-V.

The drive device of the invention is particularly advantageous if the electrical machine is a starter/generator of the internal combustion engine in a motor vehicle. In this case, the electrical machine can be operated both as a motor (starter) and as a generator. It is therefore necessary to transmit a torque from the internal combustion engine to the electrical machine and from the electrical machine to the internal combustion engine. The electrical machine must be sufficiently large to start the internal combustion engine, and hence correspondingly high torques are transmitted. Accordingly, the drive device must be able to transmit a high torque reliably by means of the belt when starting the internal combustion engine, even at low temperatures. This is reliably ensured by the drive device according to the invention.

The problem of rotary vibrations occurs primarily when coupling an electrical machine or a generator due to its high moment of inertia. Thus, the invention also advantageously proposes using the toothed side of the belt to drive the other machine auxiliary units. Therefore, the crankshaft reliably supplies torque via the toothed side of the belt to the other machine auxiliary units of this type, such as a power steering pump or an air-conditioning compressor.

The electrical machine preferably also functions as a belt tensioner. More particularly, a spring may be provided to adjust the electrical machine and to tension the belt. Alternatively or additionally for two wheels may be associated movably with the electrical machine to ensure a desired belt tension.

A clutch, such as a magnetic clutch, preferably is provided for decoupling the belt or the belt pulley from the crankshaft. The clutch enables air-conditioning when the motor vehicle is stationary and when the internal combustion engine is turned off. To this end, the starter/generator is operated as a motor that uses the belt to drive the air-conditioning compressor. Therefore, the internal combustion engine need not rotate together with the starter/generator because the crankshaft has been decoupled. A further advantage is the option of decoupling the starter/generator when the battery is fully charged. Therefore, the belt drive could be decoupled from the internal combustion engine, for example, when an electrical air-conditioning arrangement is present and the air-conditioning system is switched off. Thus, no additional torque would be required for driving the starter/generator.

BRIEF DESCRIPTION OF THE DRAWING

The single FIGURE schematically shows a particularly preferred embodiment of the invention.

DETAILED DESCRIPTION OF THE PREFERRED EMBODIMENT

Figure 1:
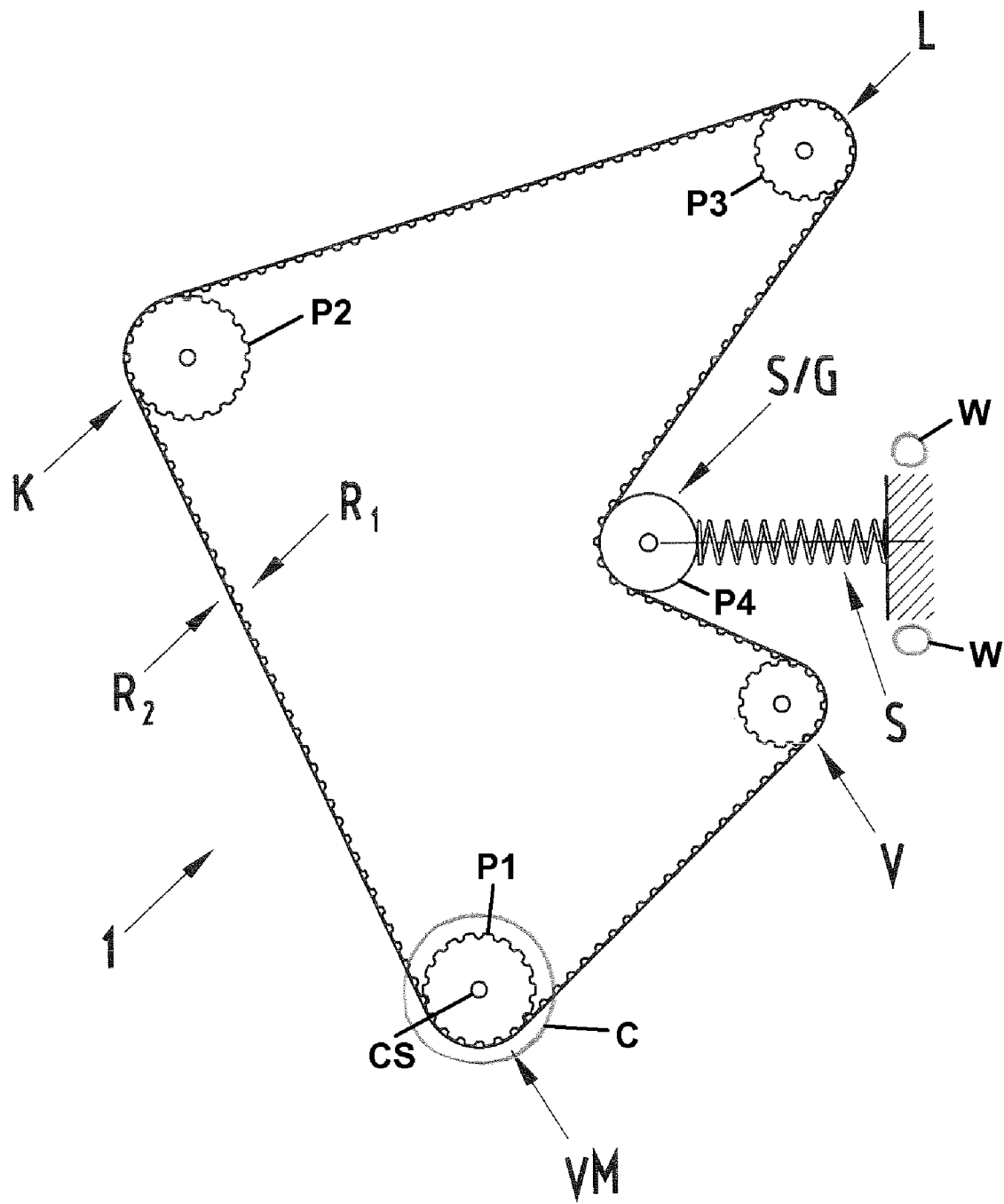

A drive device in accordance with the invention is identified by the numeral 1 in the FIGURE and is associated with machine auxiliary units K, L, S/G, which in this case are an air-conditioning compressor K, a power steering pump L and a starter/generator S/G. The drive device 1 is driven by a machine VM, in this case an internal combustion engine. The internal combustion engine VM has a crankshaft CS and a corresponding belt pulley P1 for driving the drive device 1. A belt B is mounted to the internal combustion engine belt pulley P1 to drive the belt pulleys P2, P3, P4 of the respective machine auxiliary units K, L, S/G. A deflection roller V also is provided. The belt B is a combined toothed/drive belt in this case. More particularly, the belt B has opposite first and second sides $R_1$ and $R_2$. The first side $R_1$ of the belt B has a tooth system and the second side $R_2$ of the belt B is configured as a drive belt. The second side $R_2$ may be designed as a poly-V-belt side to transmit correspondingly high forces. In this regard, poly-V belt is a term of art that is well documented in the relevant literature, and is shown, for example, in the above described DE 102 00 686, the disclosure of which is incorporated herein by reference. The toothed first side $R_1$ of the belt is provided for reliably transmitting the torque from the crankshaft CS to the belt B. To this end, the belt pulley P1 of the crankshaft CS is designed as a toothed belt pulley to interact with the toothed side $R_1$ of the belt B. The belt pulleys P2, P3 associated with the machine auxiliary units K, L also are designed as toothed belt pulleys to interact with the toothed side $R_1$ of the belt B. The deflection roller V also is configured to be driven by the toothed side $R_1$ of the belt B.

The starter/generator S/G develops high inertia and hence has a poly-V belt pulley P4 that is connected by the second side $R_2$ of the belt B. In this case, the drive belt side $R_2$ is designed as a poly-V belt for transmitting a correspondingly high torque between the belt B and the starter/generator S/G. The torque between the belt B and the starter/generator S/G is not transmitted by the toothed first side $R_1$ of the belt B, and therefore no rotary vibrations are transmitted between the crankshaft CS of the internal combustion engine VM and the starter/generator S/G. Consequently, reliable transmission of a high torque, without interfering vibrational loading, is possible between the crankshaft CS and the machine auxiliary units K, L and S/G.

The electrical machine preferably also functions as a belt tensioner. More particularly, a spring S is provided to adjust the starter/generator S/G and to tension the belt B. Alternatively or additionally for two wheels W may be associated movably with the starter/generator S/G to ensure a desired tension for the belt B.

A clutch C, such as a magnetic clutch, preferably is provided for decoupling the belt B or the belt pulley P1 from the crankshaft CS. The clutch C enables air-conditioning when the motor vehicle is stationary and when the internal combustion engine VM is turned off. To this end, the starter/generator S/G is operated as a motor that uses the belt B to drive the air-conditioning compressor K. Therefore, the internal combustion engine VM need not rotate together with the starter/generator S/G because the crankshaft CS has been decoupled. A further advantage is the option of decoupling the starter/generator S/G when the battery is fully charged. Therefore, the belt drive could be decoupled from the internal combustion engine VM, for example, when an electrical air-conditioning arrangement is present and the air-conditioning system is switched off. Thus, no additional torque would be required for driving the starter/generator S/G.

What is claimed is:

1. A drive device for machine auxiliary units for transmitting a machine drive force from a machine to the machine auxiliary units by means of a belt, wherein at least one of the machine auxiliary units is an electrical machine that has either a poly-V-belt pulley to be driven by a poly-V-belt or a toothed belt pulley to be driven by a toothed belt, characterized in that the belt has a toothed side and a poly-V side opposite the toothed side, wherein the machine has a toothed belt pulley designed to drive the toothed side of the belt for transmitting the machine drive force to the electrical machine if the electrical machine has a poly-V-belt pulley and wherein the machine has a poly-V-belt pulley for transmitting the machine drive force to the electrical machine if the electrical machine has a toothed belt pulley.

2. The drive device of claim 1, wherein the electrical machine comprises a belt tensioning means for setting a desired belt tension of the belt.

3. The drive device of claim 2, wherein the belt tensioning means comprises at least one spring disposed for moving at least part of the electrical machine relative to the belt.

4. The drive device of claim 2, wherein the belt tensioning means comprises two coupled wheels arranged to be moved relative to the belt for tensioning the belt.

5. The drive device of claim 1, wherein at least one further machine auxiliary unit is provided that can be driven by the toothed side or the poly-V-side of the belt.

6. The drive device of claim 5, wherein the further machine auxiliary unit is a power steering pump, air-conditioning compressor or water pump.

7. The drive device of claim 1, wherein the machine is an internal combustion engine, the machine belt pulley is mounted to a crankshaft, and the electrical machine is a starter/generator in a motor vehicle.

8. The drive device of claim 1, further comprising a clutch for selectively uncoupling the machine belt pulley from the belt.

9. A drive device comprising:
an internal combustion engine with a toothed pulley that is driven rotationally by operation of the internal combustion engine;
a starter/generator having a non-toothed pulley;
a belt having opposite first and second sides, the first side of the belt having an array of teeth and being engaged with the toothed pulley of the internal combustion engine, the second side of the belt defining a poly-V-belt design and being engaged with the non-toothed pulley of the and
at least one machine auxiliary unit having a toothed pulley engaged with the first side of the belt, whereby the belt transmits rotatable driving forces between the internal combustion engine and the at least one machine auxiliary unit via the first side of the belt and transmits the rotatable driving forces between the internal combustion engine and the starter/generator via the second side of the belt.

10. The device of claim 9, wherein the machine auxiliary unit is an air-conditioning compressor or a power steering pump.

11. The device of claim 9, further comprising a belt tensioning means for setting a desired belt tension of the belt.

12. The device of claim 9, further comprising a clutch for selectively uncoupling the pulley of the internal combustion engine from the belt.

13. A drive device comprising:
   a belt having opposite first and second sides, the first side of the belt having an array of teeth, the second side of the belt defining a poly-V-belt design;
   a machine with a machine pulley that is driven rotationally by operation of the machine, the machine pulley being engaged with one of the first and second sides of the belt for transmitting a driving force from the machine to the belt;
   a machine auxiliary unit having an auxiliary unit pulley engaged with the side of the belt opposite the side engaged by the machine pulley so that the auxiliary unit pulley of the machine auxiliary unit is driven by the belt.

14. The drive device of claim 13, wherein the machine pulley of the machine is a toothed pulley and engages the first side of the belt.

15. The drive device of claim 14, wherein the machine auxiliary unit is an electrical machine.

16. The drive device of claim 15, wherein the machine is an internal combustion engine, the machine pulley is mounted to a crankshaft, and the electrical machine is a starter/generator in a motor vehicle.

17. The drive device of claim 15, wherein the electrical machine comprises a belt tensioning means for setting a desired belt tension of the belt.

18. The drive device of claim 13, further comprising a clutch for selectively uncoupling the machine pulley from the belt.

19. The drive device of claim 13, wherein the machine auxiliary unit is a first machine auxiliary unit, and the auxiliary unit pulley is a first auxiliary unit pulley, the drive device further comprising a second machine auxiliary unit with a second auxiliary unit pulley engaged with the side of the belt that is engaged by the machine pulley.

* * * * *